Nathaniel Hoggatt's
Impd. Cotton Gin Feeder.
117074
PATENTED JUL 18 1871
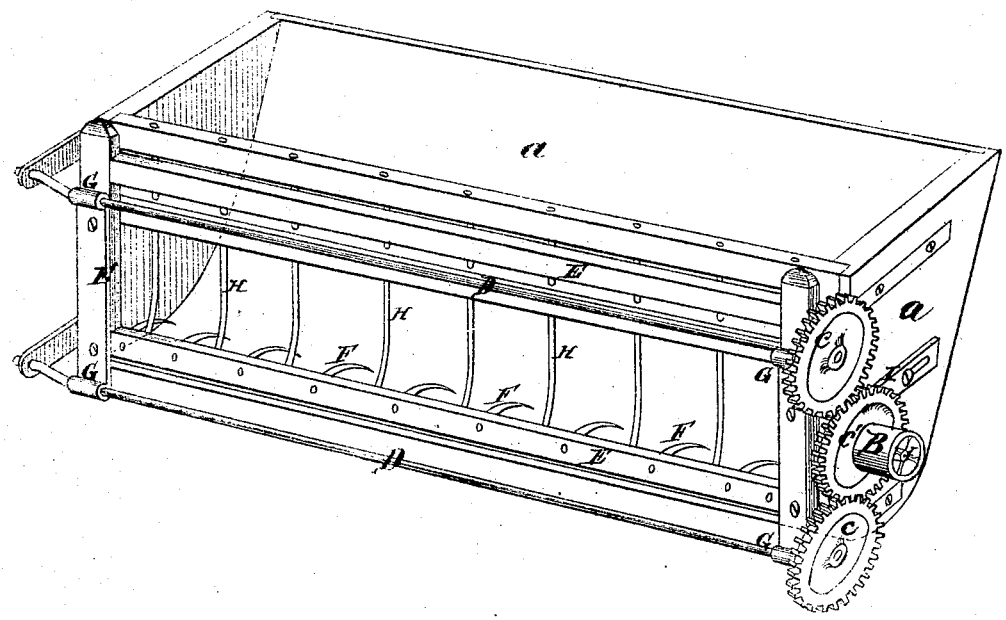
Witnesses:
Hu Martin
J P Derrick
Inventor
Nathaniel Hoggatt

UNITED STATES PATENT OFFICE.

NATHANIEL HOGGATT, OF MADISON PARISH, LOUISIANA.

IMPROVEMENT IN COTTON-GIN FEEDERS.

Specification forming part of Letters Patent No. 117,074, dated July 18, 1871.

*To all whom it may concern:*

Be it known that I, NATHANIEL HOGGATT, of Madison parish, State of Louisiana, have invented certain Improvements in Cotton-Gin Feeder, of which the following is a specification:

The first part of my invention relates to the combination of a hopper, provided with bars and rotary feeding-fingers, with a gin-stand, in such a manner that the said feeding-fingers shall be capable of feeding the cotton to the gin, and also of effectually preventing the cotton from coming in contact with the gin-saws in bundles, as when fed by hand; the object of this part of my invention being to separate the cotton operated upon with more uniformity, and to give it a more loose and clean appearance.

Figure 1 is a perspective view of a machine embodying my invention.

A is the hopper of the machine, which hopper should be substantially constructed to resist the vibrations of the operating parts attached thereto. B is the driving-pulley, which is fastened to wheel C', and revolves upon a stud, I, attached to the end of hopper, from which latter pulley motion is communicated through intermediate gears C C' C, from which motion is communicated to the operating parts. D D are shafts which move the frame E, to the lower bar of which, extending the whole length of hopper, the rotary fingers F are, at regular distances, attached, by means of which the cotton is fed to the gin. These shafts are made with a crank and bearing upon each end, to one end of which the intermediate gears C C are firmly secured. The frame E derives its motion from these cranks on shafts, by being connected to them by four bearings, G, two at each end of frame, as shown in the drawing. The front part of hopper is provided with vertical bars H, set at the proper distance apart along its entire length, and supported at the top and middle by two parallel bars firmly attached to the end pieces forming a part of the hopper. These bars H are straight from the top until after passing through the lower support, from which point they are curved gently outward from the front part of hopper to a slight distance beyond the extreme outward position of the end of fingers.

The cotton to be ginned is introduced at the top part of hopper, as shown in Fig. 1, when the frame E, which is set in motion by the shafts and cranks D, strikes a circle varying according to the length of cranks, causing the fingers F in coming around to reach into hopper between the bars H and draw out a certain amount of cotton, varying according to the length of fingers. The cotton is not drawn through between the bars, but down and under the curved parts at their bottom ends, and as the cranks rise in completing the revolution the fingers are raised up from between the curved part of the bars, leaving the cotton thus drawn out to drop down into a hopper always placed upon the top of a cotton-gin, when it comes in contact with the saws comprising a part of it and the seeds are separated from the lint.

I claim as my invention—

The combination, with the gears C C' C, and shafts with cranks D D, frame E, and fingers F, of a hopper, A, and bars H, substantially as and for the purpose hereinbefore set forth.

NATHANIEL HOGGATT.

Witnesses:
 H. N. MARTIN,
 Z. P. DEDERICK.